UNITED STATES PATENT OFFICE 2,155,017

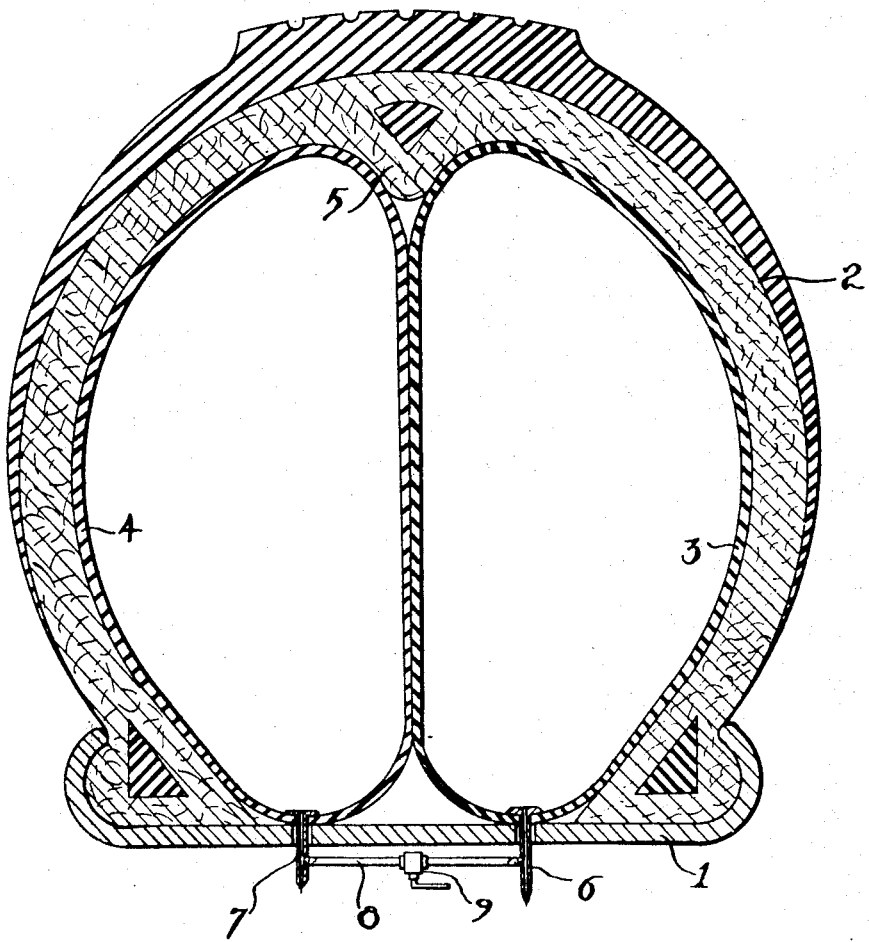

PNEUMATIC TIRE

Albert J. Kramer, Washington, D. C.

Application July 21, 1938, Serial No. 220,429

1 Claim. (Cl. 152—341)

(Granted under the act of March 3, 1883, as
amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to pneumatic tires.

One of the objects of this invention is to obviate the necessity for carrying spare tires on vehicles.

Another object of this invention is to eliminate, in the event of a blow-out or puncture, a so-called "flat-tire" permitting the operator of the vehicle to continue on his travel until a repair station is available.

A further object of this invention is not only to eliminate a complete flat tire, but to provide means by which the damaged tire can be fully inflated without removing it from the rim, or making any repairs whatsoever.

A still further object of this invention is the provision of means whereby a ruptured tire at the point of rupture is automatically reinforced temporarily until the damage can be repaired.

Another, and still further object of this invention, is the provision of reinforcing means for a tire where it is most vulnerable to wear and puncture, at the same time keeping the entrapped compressed air away from this vulnerable area.

The following description, considered together with the accompanying drawing, will fully disclose this invention, and further objects and advantages thereof will be apparent.

The drawing referred to is a cross-sectional view, illustrating an embodiment of my invention, in which the numeral 1 designates an ordinary circular rim upon which is mounted a tire casing 2, in which casing two ordinary inflatable tubes 3 and 4 are disposed side by side in mutual vertical contact. The tire casing 2 differs from the ordinary tire in that the center of the inner wall is provided with an annular projection 5, the cross-section of which is in the general shape of a V with the sides thereof slightly concave to conform to the sides of the tubes 3 and 4 when inflated. This concave annular member 5 provides a positive bearing surface for the tubes 3 and 4, at the same time reinforcing the tire at the center, and preventing the tubes 3 and 4 from slipping around in the tire casing 2.

The valve stems 6 and 7 of the tubes 3 and 4, respectively, project through holes in the rim 1. These valve stems have the usual valves disposed therein. The tubes may be inflated separately by first inflating one of the tubes to half of the required pressure and then inflating the other tube to the full pressure required. This gives an equal volume of air in both tubes, if they are of the same size, at the required pressure. However, the two valve stems may be connected with a removable pipe or tube 8, said pipe or tube having a valve 9 which can be controlled exteriorly. By using this arrangement both of the tubes 3 and 4 may be inflated simultaneously through either of the valves in the valve stems 6 and 7 when the valve 9 is open. By closing this valve 9, the tubes 3 and 4 may be inflated individually.

Should one of the tubes 3 or 4 be deflated due to a blow-out or puncture, the other tube will remain inflated and force the deflated tube to completely collapse against the inside wall of the casing 2. In this way the deflated tube acts as a temporary reinforcement for the broken or punctured wall of the casing, cushioning any pointed object through the tire casing. The pressure will ordinarily be reduced by approximately one-half in the uninjured tube, which pressure can be increased if desired. However, in cases of emergency, this reduced pressure will ordinarily be sufficient to continue travel with the vehicle, without repairs, until a convenient repair station is reached.

Since the tubes are disposed on opposite sides of the tire casing, both are not likely to become ruptured at the same time.

While I have illustrated in the accompanying drawing, a tire using two inflatable tubes within the tire casing, it is to be understood that this invention is not limited to this number of tubes, but 3, 4 or more tubes may be used if desired.

Other methods using more than one tube in a tire casing have been developed, but these methods provide for one tube being disposed within another. This has been found to be unsatisfactory because both tubes are subject to puncture at the same time. Also, the manufacturing costs are very expensive and in the event the outer tube becomes disabled, the inflation of the inner tube does not give a satisfactory reinforcement, because there is no reinforcing wall between the unharmed tube and the punctured wall of the disabled tube. In the instant invention there is such a reinforcing wall. Also, where one tube is disposed within the other, irreparable damage to one of the tubes makes it necessary to discard both. In the present invention, the tubes are independent and damage to one does not affect the other.

One of the important advantages of this invention is the fact that sharp pointed objects in the tire casing 2, at the point where the two tubes 3 and 4 abut each other, will not damage the tubes, but simply pass between them.

This invention is readily adaptable to existing conventional designs, requiring nothing more than the placing of an additional tube in a tire casing already provided with a tire and supplying an additional hole in the rim for the valve stem of the additional tube. For the purpose of proper alignment, it may be necessary to make two additional holes. The member 5 need not be a fixed part of the casing 2, but may be made as a separate part for removable insertion between the tubes 3 and 4. In this way, any standard make of tire casing can be made to provide the full advantages of this invention. This removable feature is to be understood as being fully within the scope of this invention.

It is preferable to have the vertex of this V-shaped member arcuated, substantially as illustrated in the drawing, so that it will not present a sharp edge in the event it becomes necessary to use just one of the tubes 3 and 4 to inflate the casing 2.

Having thus described my invention, I claim:

A pneumatic tire having a plurality of inflatable tubes disposed contiguously within a tire casing, said tubes having valve stems, said valve stems having valves, and valved removable tubular means connecting said valve stems at points between the valves and the inflatable tubes.

ALBERT J. KRAMER.